(12) United States Patent
Hoppe et al.

(10) Patent No.: US 9,404,541 B2
(45) Date of Patent: Aug. 2, 2016

(54) MATING CONNECTION FOR CONNECTING TWO COMPONENTS IN A NON-ROTATABLE WAY AND METHOD

(71) Applicant: Schaeffler Technologies AG & Co. KG, Herzogenaurach (DE)

(72) Inventors: Marcus Hoppe, Achern (DE); Steffen Patze, Buehl (DE); Cyriaque Steffen, Haguenau (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 263 days.

(21) Appl. No.: 14/076,532

(22) Filed: Nov. 11, 2013

(65) Prior Publication Data

US 2014/0064843 A1     Mar. 6, 2014

Related U.S. Application Data

(63) Continuation of application No. PCT/DE2012/000419, filed on Apr. 24, 2012.

(30) Foreign Application Priority Data

May 11, 2011    (DE) .......................... 10 2011 101 152

(51) Int. Cl.
*B21J 15/02*     (2006.01)
*B21J 15/12*     (2006.01)
(Continued)

(52) U.S. Cl.
CPC .................. *F16D 1/072* (2013.01); *B21J 15/02* (2013.01); *B21J 15/12* (2013.01); *B21J 15/14* (2013.01);
(Continued)

(58) Field of Classification Search
CPC ............ B21J 15/02; B21J 15/12; B21J 15/14; B21K 25/00; F16B 5/045; F16D 1/072; F16D 1/076; F16D 2250/00; F16D 2250/0061; F16D 2250/0084; F16D 2300/12; F16D 2300/26
USPC ......... 403/274, 335, 337, 338, 348, 373, 381; 29/428, 437, 505, 509, 521
See application file for complete search history.

(56) References Cited

U.S. PATENT DOCUMENTS 4,983,066 A * 1/1991 Becker .................... F16D 1/072
                                                      403/274
5,579,568 A    12/1996 Hudson et al.
(Continued)

FOREIGN PATENT DOCUMENTS

CN    200995250 Y    12/2007
CN    101574722 A    11/2009
(Continued)

OTHER PUBLICATIONS

Translation of JP 08-290224. Tanaka, H. Caulking device for connecting deformed parts with other components has servomotor to drive each ball screw provided in recess part of caulking head. Nov. 5, 1996.*

*Primary Examiner* — Josh Skroupa
(74) *Attorney, Agent, or Firm* — Simpson & Simpson, PLLC (57) ABSTRACT

A method for producing a plug connector and to a plug connector for rotationally connecting a first component to a second component, for example, in a clutch assembly, where the first component includes at least one connecting element, where the connecting element protrudes through an opening of the second component, where the connecting element has an end piece above the second component, where a cross-section of the end piece is wider than a cross-section of the opening, where the widening of the end piece is produced by means of a rolling method.

20 Claims, 6 Drawing Sheets

(51) Int. Cl.
  *B21J 15/14*  (2006.01)
  *B21K 25/00*  (2006.01)
  *F16D 1/072*  (2006.01)
  *F16D 1/076*  (2006.01)
  *F16D 1/10*   (2006.01)
  *F16B 5/04*   (2006.01)

(52) U.S. Cl.
  CPC .............. *B21K 25/00* (2013.01); *F16D 1/076* (2013.01); *F16D 1/101* (2013.01); *F16B 5/045* (2013.01); *F16D 2250/00* (2013.01); *F16D 2300/12* (2013.01); *F16D 2300/26* (2013.01); *Y10T 29/49826* (2015.01); *Y10T 29/49908* (2015.01); *Y10T 403/648* (2015.01); *Y10T 403/7094* (2015.01)

(56) References Cited

U.S. PATENT DOCUMENTS

2001/0026727 A1    10/2001  Okabe et al.
2009/0142106 A1*    6/2009  Kondo ............... G03G 15/0812
                                                  399/274

FOREIGN PATENT DOCUMENTS

| CN | 101680528 A    | 3/2010  |
| CN | 201482904 U    | 5/2010  |
| CN | 201693120 U    | 1/2011  |
| DE | 3248197 A1     | 6/1984  |
| DE | 102008027443 A1 | 1/2009 |
| DE | 102010050462 A1 | 5/2011 |
| JP | 8290224 A      | 11/1996 |
| WO | 03070398 A1    | 8/2003  |

* cited by examiner

MATING CONNECTION FOR CONNECTING TWO COMPONENTS IN A NON-ROTATABLE WAY AND METHOD

CROSS-REFERENCE TO RELATED APPLICATIONS

This application is filed under 35 U.S.C. §120 and §365(c) as a continuation of International Patent Application No. PCT/DE2012/000419 filed Apr. 24, 2012, which application claims priority from German Patent Application No. 10 2011 101 152.1 filed May 11, 2011, which applications are incorporated herein by reference in their entireties.

FIELD OF THE INVENTION

The present invention relates to a mating connection for connecting two components in a non-rotatable way and to a method for creating a non-rotatable connection.

BACKGROUND OF THE INVENTION

German Patent Application No. 10 2008 027 443 A1 discloses a clutch assembly, including a mating connection of this general kind. The mating connection is embodied as a mating spline, with a flange part of the dual mass flywheel having a shoulder axially formed there. A ring gear that forms an input-side part of the mating connection is received on the shoulder in a material-locking way by a welding connection. The shoulder needs to be formed on the flange and the shoulder and the ring gear need to be machined.

BRIEF SUMMARY OF THE INVENTION

An object of the invention is to provide an improved mating connection and an improved method for creating the mating connection, for example, with respect to cost-efficient, straightforward production.

An advantage of the mating connection of the invention is that the mating connection may be manufactured in a straightforward, cost-efficient way. This is attained by flattening an end piece formed on a connecting element of the first component and extending through an opening of the second component in an end piece by a rolling method. The rolling method provides a straightforward, quick and cost-efficient flattening of the end piece. The end piece of the connecting element protrudes from the opening of the second component. In the rolling process, the end piece is flattened, for example, by a rotating roller, to secure the connecting element in a form-locking way against being pulled out of the opening.

Depending on the selected embodiment, the opening may be open to the side. This simplifies the formation of the opening.

In an embodiment, the second component is embodied as a ring gear, representing a retainer ring.

For example, with respect to forming the ring gear, the mating connection described above is easy and cost-efficient to manufacture and provides sufficient attachment between the ring gear and the first component.

In another embodiment, the first component includes a toothed ring gear whose teeth protrude from a plane of the component and represent the connecting elements. Thus, the connecting elements can be formed in a straightforward forming process for creating teeth. Alternatively, the first component may be of multi-part construction, having a base body to which one or more connecting means (such as vertical rivets) are fastened and pass through the second component to be formed in the rolling process to create a form-locking connection between the components.

In yet another embodiment, between the teeth, the ring gear includes tooth segments that protrude upward beyond the plane of the first component. This provides an increased stability of the teeth. In addition, the tooth segments formed between the teeth may act as a support for the second component.

In yet another embodiment, the ring gear has an angled cross-section, with a first surface portion of the ring gear essentially parallel to the upper side of the first component and having the openings formed there, and the second surface portion being angled in the direction of the first component and including a tooth structure of the ring gear. This provides a stable formation of the ring gear, which additionally can be securely and easily connected to a toothed ring gear in a form-locking way.

In yet another embodiment, the ring gear is formed on the interior side, i.e., the tooth structure extends inwardly in the direction of a center of the ring gear.

In yet another embodiment, the ring gear is formed on an exterior side and the tooth structure extends outwardly with respect to a radial center. Both embodiments are suitable for providing a stable ring gear that may be securely and reliably fastened to a first component by the mating connection described above.

In yet another embodiment, the ring gear has contact surfaces that rest on the toothed segments. This causes the ring gear to rest on the first component in a stable way.

In terms of the method, the object of the invention is attained by a method where two components are combined by passing a connecting element of a first component through an opening of a second component and where the connecting element has an end piece that protrudes from the second component and is flattened by lateral pressure against the end piece by means of a roller that is rolled over the end piece to widen the cross section of the end piece.

In the method of the invention, the main flow direction of the deformed material corresponds to the main direction of action of the force, whereas in standard riveting processes, the material is squeezed away in a direction that is perpendicular to the main direction of action of the force.

In this way, a deformation of the end piece is achieved in a straightforward and reliable process that exposes the end piece to comparatively little stress. In addition, the described method is suitable for cost-efficient mass production as the rolling roller is capable of flattening a plurality of end pieces in the desired way within a short period of time.

In yet another embodiment, the roller is rolled along a longitudinal side of the connecting element and the connecting element is embodied as an ear. The ear has a longitudinal side that is greater than the transverse side. The transverse side and the longitudinal side are perpendicular to the longitudinal extension of the connecting element.

The relative direction of movement between the roller and the component, for example the direction of rotation, is changed as the end piece is being rolled flat. An axis of rotation of the roller is arranged, for example, to be inclined in the radial direction in the direction of the components with respect to a central axis of rotation.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
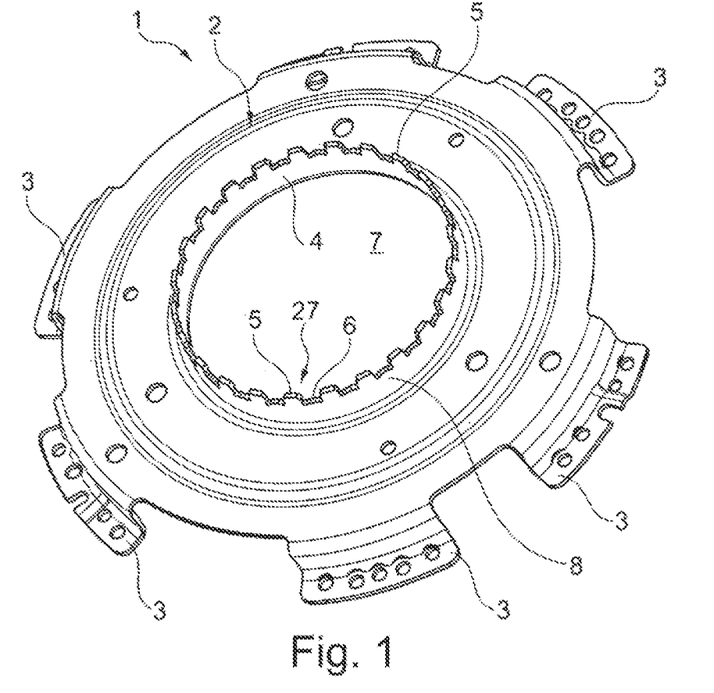
FIG. 1 is a first component.

FIG. 1 shows first component 1, for example, representing a housing part of a twin clutch arranged on a transmission. The first component has a plate-shaped basic shape essentially arranged in one plane. In the illustrated example, the basic shape is that of an annular disc. Flanges 3 are distributed along the circumference on an outer border of annular disc 2. On an interior border region, first component 1 has ring gear 4 including connecting elements 5 formed as teeth. Connecting elements 5 protrude beyond an upper side of annular disc 2 in an upward direction by a predetermined distance. Depending on the selected embodiment, connecting elements 5 are aligned at a right angle relative to the plane of annular disc 2. In the illustrated embodiment, toothed segments 6 are formed between two connecting elements 5. These toothed segments 6 are likewise part of ring gear 4, but protrude from annular disc 2 by a smaller distance.

Ring gear 4 and annular disc 2 are of unipartite construction, for example. Ring gear 4 surrounds central circular opening 7 of annular disc 2. Ring gear 4 is created, for example, by punching opening 7 out of annular disc 2 and subsequently forming and drawing a ring gear sleeve and subsequently punching out connecting elements 5. The punching is done, for example, by a tool that simultaneously punches out two adjacent connecting elements 5. Thus due to the manufacturing process, two adjacent connecting elements have lateral surfaces of different slant. Connecting elements 5 form riveting tabs. Depending on the selected embodiment, ring gear 4 may be produced in a different way. Moreover, segments 6 may be dispensed with and connecting elements 5 may have a clear height extending to annular disc 2. Moreover, depending on the selected embodiment, ring gear 4 may likewise be formed on an exterior border of first component 1. At least the connecting elements are made of a deformable material. The first and second components are made of sheet metal, for example.

Ring gear 4 has connecting elements 5 of identical width and identical distance to neighboring connecting element 5. Depending on the selected embodiment, the width of connecting elements 5 and/or the distances between connecting elements 5 may vary. In the most basic embodiment, only single connecting element 5 that protrudes from the plane of annular disc 2 may be provided. Furthermore, ring gear 4 may protrude from the plane of annular disc 2 in the direction of the underside. The construction and functioning of a clutch assembly and the mating connection thereof is described in detail in German Patent Application No. 10 2008 027 443 A1 and will thus not be explained any further herein.

Figure 2:
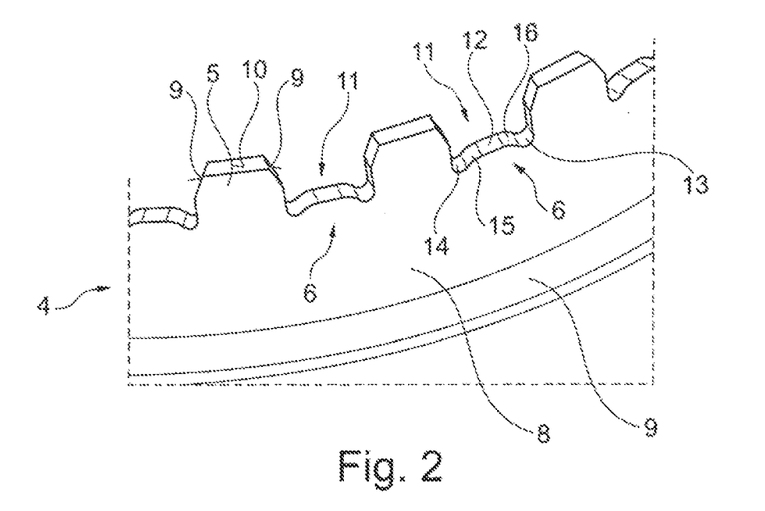
FIG. 2 is an enlarged view of a detail of a ring gear of the first component.

FIG. 2 illustrates a detail of ring gear 4. In a lower region adjacent to annular disc 2, ring gear 4 is embodied as sleeve 8. In the region of the upper border of sleeve 8, connecting elements 5 are formed as teeth. Respective segment 6 is formed between connecting elements 5. On opposing transverse sides in their upper end regions, connecting elements 5, for example, have surfaces that are inclined towards each other. In this way, the width of connecting element 5 tapers towards upper end face 10. The tapered end piece of connecting element 5 facilitates an insertion of connecting element 5 into an opening of a second component. Second end face 11 of segment 6, for example, has central region 12 that is higher than adjacent lateral regions 13, 14. Lateral regions 13, 14 adjoin respective connecting element 5. Depending on the selected embodiment, central region 12 may merge into lower lateral regions 13, 14 via first and second rounded portions 15, 16. First and second lateral regions 13, 14 may likewise be embodied as rounded portions. Central region 12 is a flat surface, for example. The flat surface of central region 12 is parallel, for example, to the plane of annular disc 2. End faces 10 are flat surfaces, for example, that are parallel to the plane of annular disc 2.

Figure 3:
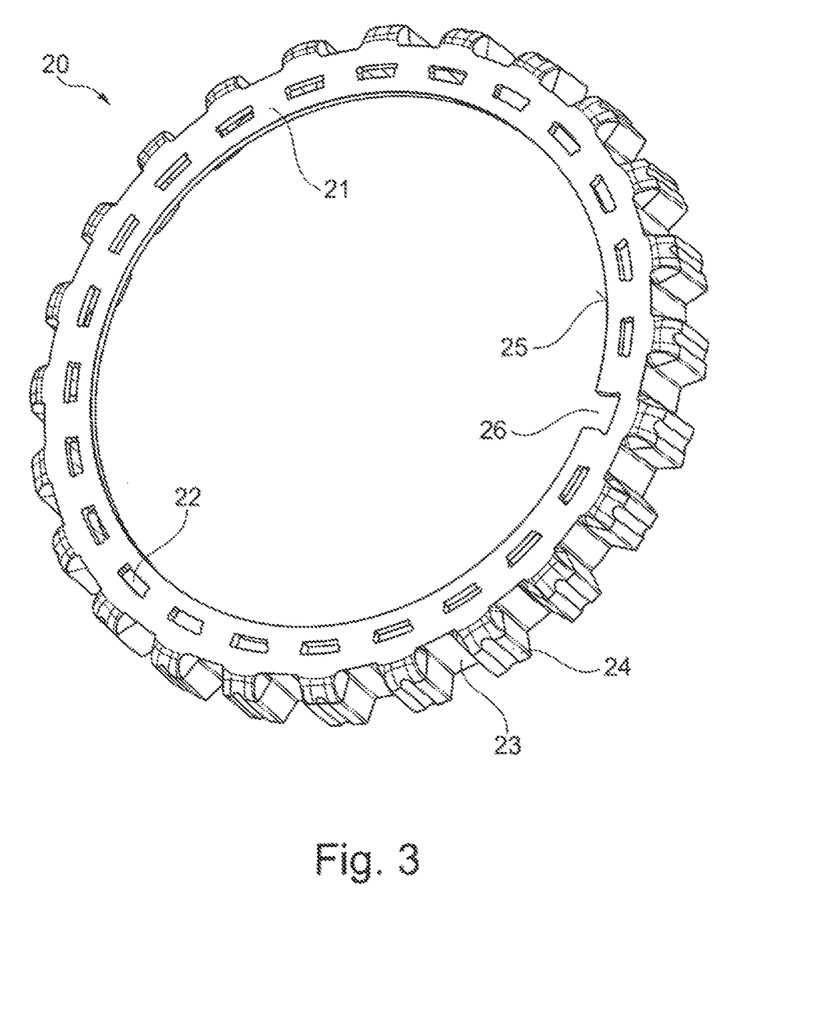
FIG. 3 is a second component.

FIG. 3 illustrates second component 20, which is shaped as a ring gear, for example, a retainer gear in the illustrated embodiment. Second component 20 may, for example, be associated with a component of a crankshaft in a combustion engine. The second component may be part of a dual mass flywheel, for example. The basic body of second component 20 has an L-shaped cross section. The basic body includes first surface portion 21 shaped as annular surface 21 provided with openings 22, 26. Openings 22 are slots. Openings 22 are distributed along annular surface 21, with slots 22 aligned along a circular line. In an outer region, first surface portion 21 merges into sleeve-shaped second surface portion 23, which is perpendicular, for example, to first surface portion 21. Tooth structure 24, whose teeth protrude in a radially outward direction is formed on an exterior side of second surface portion 23. Depending on the selected embodiment, further openings 26 that are open in a lateral direction up to interior edge 25 of the second component may be provided instead of openings 22. Corresponding further opening 26 is shown in FIG. 3.

Depending on the selected embodiment, second surface portion 23 may be formed on the interior side of annular surface 21 and tooth structure 24 may protrude in a radially inward direction. Tooth structure 24 includes a plurality of teeth that are distributed on second surface portion 23. In the illustrated embodiment, the teeth have the same shape, for example, and/or are equidistantly spaced apart from each other.

Figure 4:
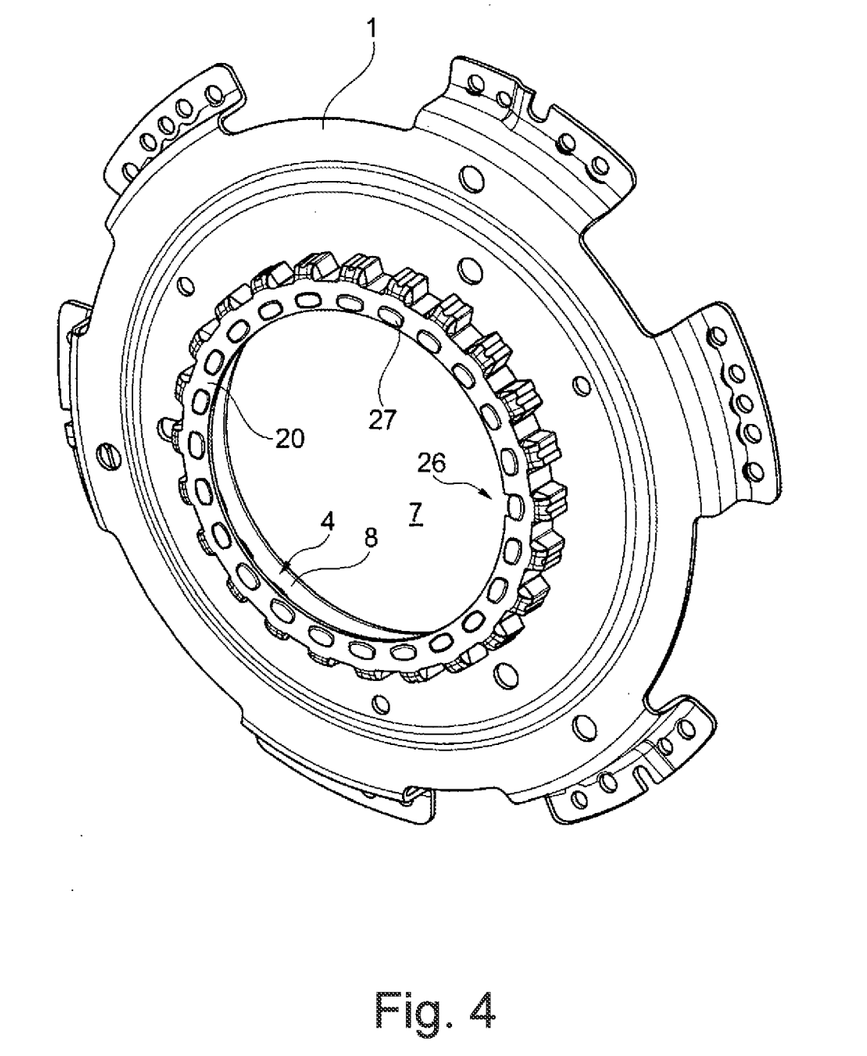
FIG. 4 illustrates the formation of a mating connection between the first and second components.

FIG. 4 illustrates a mating connection between first and second components 1, 20, respectively. Second component 20 is placed on ring gear 4 of the first component. Connecting elements 5 extend through openings 22, 26. In a rolling process, end pieces 27 of connecting elements 5 that protrude beyond an upper side of second component 20 have been formed to have a wider cross-section than openings 22, 26. This means that a form-locking connection is established between first and second components 1, 20 in a straightforward, cost-efficient process. In the described method, upper end piece 27 of connecting element 5 is flattened by forces that act in an essentially lateral direction. Due to the fact that the force essentially acts in the lateral direction, the load on connecting element 5 in the direction of first component is reduced 1. This means that any deformation of connecting element 5 underneath the end piece or any deformation of first component 1 in the transitional region between connecting element 5 and first component 1 are reduced or avoided.

Figure 5:
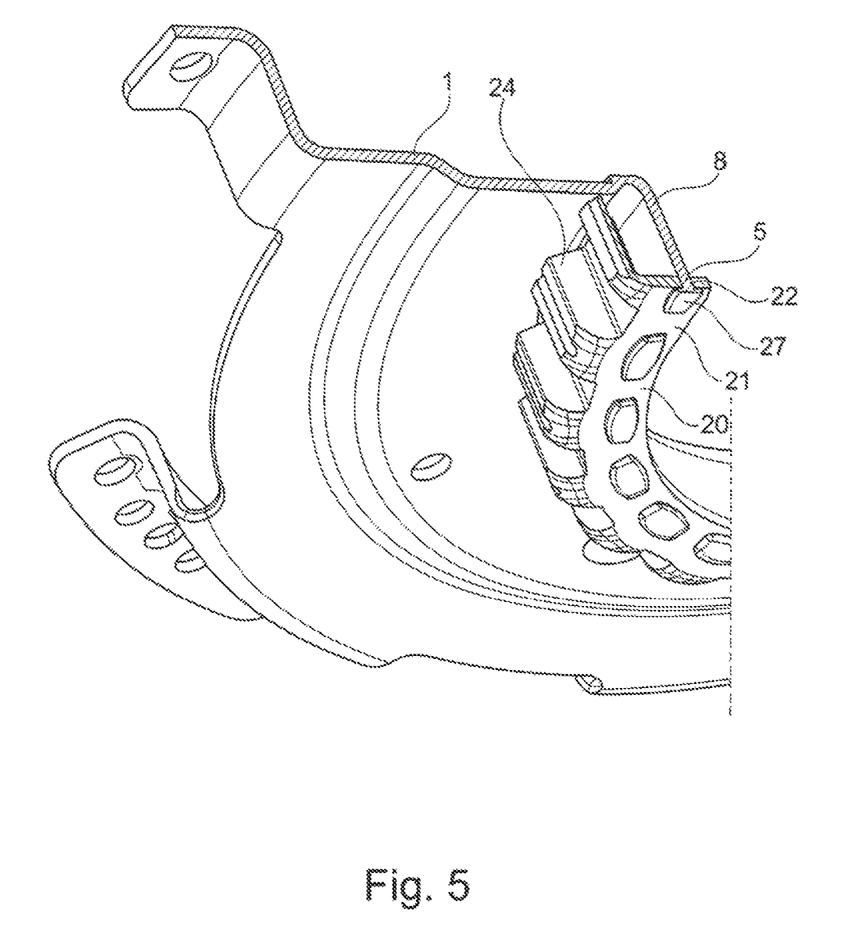
FIG. 5 is a partial cross-sectional view of the mating connection of the two components.

FIG. 5 is a partial cross-sectional view through opening 22 of the mating connection shown in FIG. 4. The widened shape of end piece 27 relative to the cross-section of opening 22 is clearly visible. Due to widened end piece 27, it is impossible for second component 20 to be removed from first component 1. In the illustrated embodiment, an underside of annular surface 21 rests on an upper side of the segments, for example, on the central region of segments 6. Thus, second component 20 is supported on first component 1 in a secure and stable way.

Figure 6:
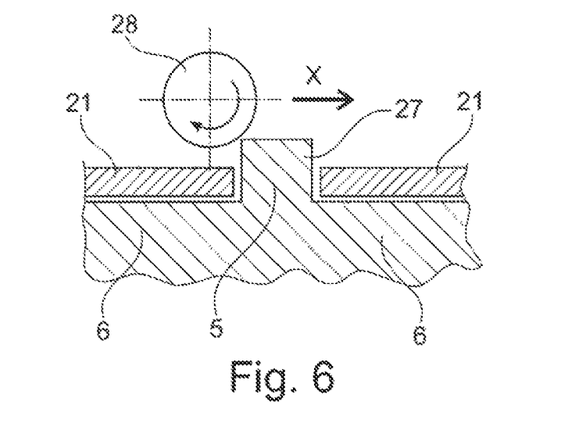
FIG. 6 is a diagrammatic representation of an arrangement for carrying out the method.
Figure 7:
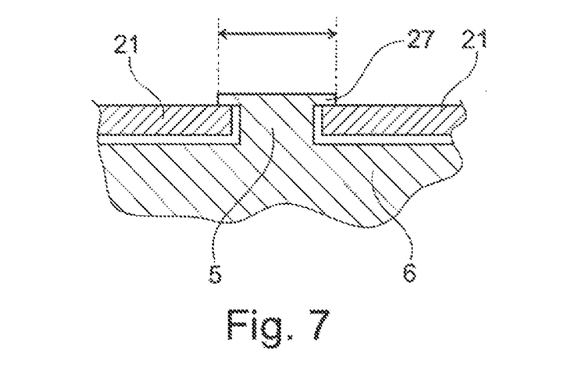
FIG. 7 is a diagrammatic cross-sectional view of a connecting element in accordance with the invention

FIG. 6 is a diagrammatic representation of a method for widening end piece 27 of connecting element 5. In this representation, second component 20 is placed on first component 1 as shown in FIG. 4. However, end pieces 27 have not yet been widened but protrude beyond an upper side of second component 20. Annular surface 21 rests on an upper side of segment 6. To widen end piece 27, end piece 27 is deformed with the aid of lateral relative movement X of components 1, 20 relative to roller 28, which is used as a forming tool. The lateral movement is parallel, for example, to the longitudinal side of connecting element 5. The deforming force is exerted by roller 28 that rolls over end piece 27 in a lateral movement. Roller 28 exerts a deforming force on the upper side of end piece 27. Due to the lateral movement of the forming tool and due to the rolling movement of the forming tool across end piece 27 the force acting on the lower regions of connecting element 5 is reduced for example in comparison to peening nevertheless achieving a sufficient widening of the cross-section of end piece 27 above the second component as shown in FIG. 7.

Figure 8:
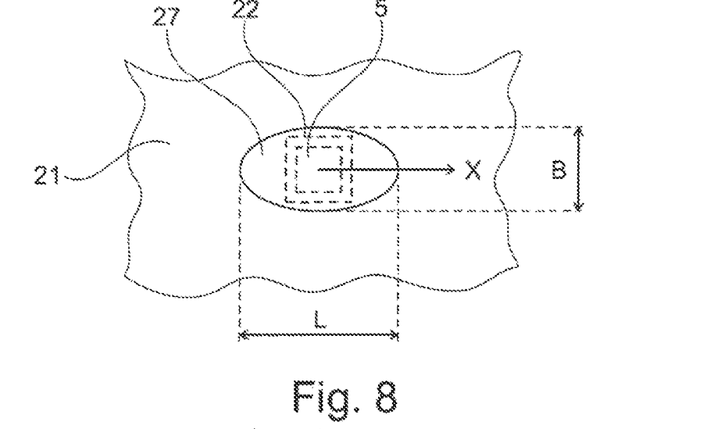
FIG. 8 is an elevational view of an end piece.

Thus, lateral border regions 28 of deformed end piece 27 extend beyond a cross-section of openings 22, 26 and beyond adjoining border regions of second component 20. Thus, it is impossible to pull second component 20 off first component 1. The process described above widens end piece 27 in both the direction of relative movement X and in a direction transverse to the direction of relative movement X as shown in FIGS. 7 and 8. Widened end piece 27 overlaps the cross-section of opening 22 in all directions. In the illustrated example, connecting element 5 and opening 22 have a square cross-section. In axis of movement X, the widening (L) of end piece 27 is more pronounced than in a direction perpendicular thereto (B). Thus, end piece 27 has an essentially oval cross-section.

The method described above provides a cost-efficient way of connecting thin-walled sheet metal parts, for example, without any deformation of the parts due to too much force. In addition, costs are saved compared to known mating connections because the connecting surfaces do not need to be created by machining and need not be welded together. As the force acts in the lateral direction, connecting elements 5 are pressed against the interior surface of openings 22 during the deformation of end pieces 27 reducing the transmission of force into regions of the first component and reducing deformation of connecting elements 5 in lower regions, for example, adjacent to component 1.

Figure 9:
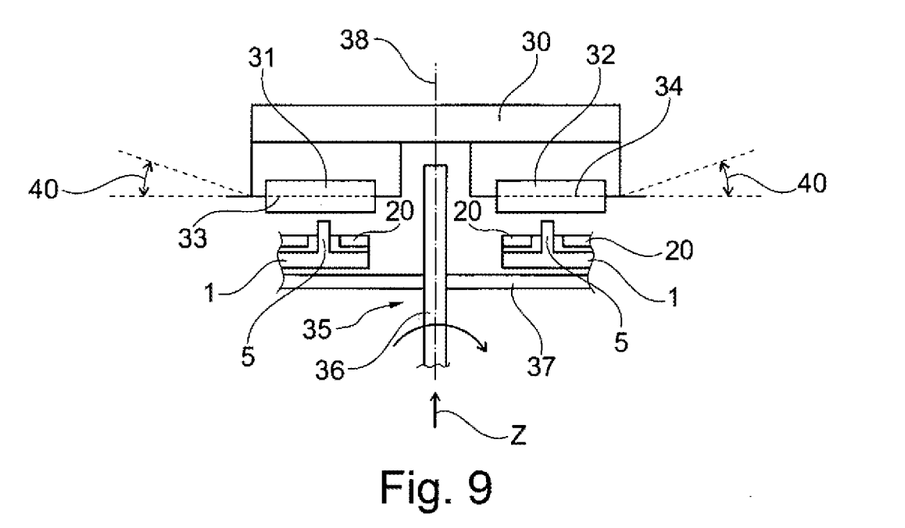
FIG. 9 is a device for flattening a connecting element.
Figure 10:
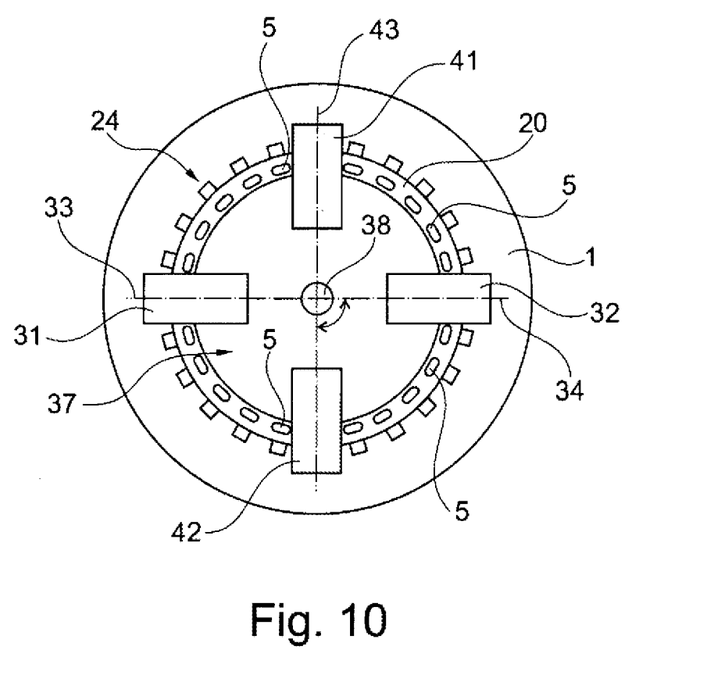
FIG. 10 is an elevational view of the device shown in FIG. 9.

FIG. 9 illustrates a device for carrying out the method of the invention. Mount 30 is provided in which at least one first roller 31 or, as shown in the illustrated example, second roller 32 are supported for rotation. In the illustrated embodiment two rollers 31, 32 are arranged next to each other, with axes 33, 34 of rotation arranged in the plane of the drawing and on one axis. In addition, rotation device 35 is provided in which pre-assembled first and second components 1, 20 are arranged. Rotation device 35 includes rotating shaft 36 on which fixing device 37 is provided. Fixing device 37 is used to fix at least first component 1. The plane of first component 1 is perpendicular to third axis of rotation 38 of rotating shaft 36. First and second axes of rotation 33, 34 of first and second rollers 31, 32 are likewise perpendicular to third axis of rotation 38. For the rolling process, during the rotation, first and second components 1, 20 including connecting elements 5 are moved through predetermined distances in the direction of the first and second rollers, i.e., in parallel with third axis of rotation 38 while rotating shaft 36 rotates in a clockwise direction. Thus, each connecting element 5 is rolled several times across rollers 31, 32 that are supported for rotation. In this process, the roller exerts pressure on end pieces 27 of connecting elements 5, causing end pieces 27 and thus the first and second components to be pushed down and flattened piece by piece. The flattening of the connecting elements may be in the range of a few millimeters. The advancement of end pieces 27 in direction Z towards rollers 31, 32 may amount to ¹⁄₁₀ mm per revolution. To carry out the rolling process in which end piece 27 is widened in a corresponding way, a roller is rolled across connecting element 5 multiple times, for example, several ten or hundred times.

The direction of rotation of rotating shaft 36 is changed, for example, at least once, possibly multiple times during a rolling process. The entire rolling process may consist of a clockwise rotation during one-half of the time and of a rotation in a counter-clockwise direction during the other half of the time. However, any other desired variation is possible, for example, a clockwise rotation during one-third of the time, a rotation in a counter-clockwise direction during another third of the time, and again a rotation in the clockwise direction during the last third of the time. In addition, variations such as a clockwise rotation during one fourth of the time, a counter-clockwise rotation during a second fourth of the time, again a clockwise rotation during the third fourth of the time and finally a counter-clockwise rotation during the last fourth of the time are possible. Reversing the direction of rotation, i.e., the direction of movement at least once achieves a more symmetrical deformation of the end piece in the direction of movement as shown in FIG. 8.

Depending on the selected embodiment, second roller 32 may be dispensed with. Moreover, multiple pairs of rollers opposing each other relative to central axis 38 may be provided. In another embodiment, axis of rotation 33 of first and/or second rollers 31, 32 may be pivoted upward by angle 40 radially to the outside relative to a plane that is perpendicular to third axis of rotation 40. Angle 40 may be up to 20°. Depending on the contour of the connecting element, angles of 10° or angles of 3° or even smaller angles may be advantageous.

FIG. 9 is a diagrammatic devotional view of an arrangement including four rollers 31, 32, 41, 42 arranged in opposing pairs relative to third axis of rotation 38. Third and fourth rollers 41, 42 are supported for rotation in mount 30 along further axis of rotation 43.

The inclined arrangement of axes of rotation 33, 34 of first and second roller 31 or 32 results in an improved deformation of connecting elements 5. In this way, connecting elements 5 are prevented from being bent in a laterally inward direction towards third axis of rotation 38 during the deformation in the rolling process.

Thus, it is seen that the Objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS a first component
b annular disc
c flange
d ring gear
e connecting element
f segments
g opening
h sleeve
i surface
j end face
k second end face
l region
m first lateral region
n second lateral region
o first rounded portion
p second rounded portion
20 second component
21 annular surface
22 opening
23 second surface portion
24 tooth structure
25 interior edge
26 further opening
27 end piece
28 forming tool
30 mount
31 first roller
32 second roller
33 first axis of rotation
34 second axis of rotation
35 rotation device
36 rotating shaft
37 fixing device
38 third axis of rotation
40 angle
41 third roller
42 fourth roller
43 fourth axis of rotation

What is claimed is:

1. A mating connection for a clutch assembly, comprising:
   a first component including:
     an annular disc;
     at least one flange along an outer border of the annular disc;
     a sleeve extending from the annular disc in a first direction;
     a first opening surrounded by the annular disc and the sleeve; and,
     a first plurality of teeth extending from the sleeve in the first direction; and,
   a second component including:
     an annular surface;
     a plurality of openings in the annular surface, wherein:
   none of the openings in the plurality of openings is open to the first opening;
   each tooth included in the plurality of teeth extends through a respective opening included in the plurality of openings;
   said each tooth has a respective end piece extending beyond the second component in the first direction; and,
   the respective end piece extends beyond the respective hole in a second direction from the respective hole toward the first opening.

2. The mating connection as recited in claim 1, wherein the plurality of openings is open in a lateral direction.

3. The mating connection as recited in claim 1, wherein the second component is a ring gear.

4. The mating connection as recited in claim 3, wherein the ring gear has an angled cross-section with a first surface portion of the ring gear extending essentially in parallel with an upper side of the first component, the plurality of openings being formed in the first surface portion, and wherein the a second surface portion is angled in the direction of the first component, a tooth structure of the ring gear being formed on the second surface portion.

5. The mating connection as recited in claim 4, wherein the second surface portion is formed on an interior side of the ring gear with the tooth structure protruding in an inward direction or wherein the second surface portion is formed on an exterior side of the ring gear with the tooth structure protruding in an outward direction.

6. A method for creating the mating connection as recited in claim 1, wherein the components are combined by passing the first plurality of teeth of the first component through the plurality of openings of the second component, comprising the step of rolling a roller across the respective end pieces of the first plurality of teeth to exert pressure on the respective end pieces at least partly in a lateral direction to achieve a widening of the respective end pieces.

7. The method as recited in claim 6, wherein the roller is rolled across the respective end pieces of the first plurality of teeth essentially along a longitudinal side of the first plurality of teeth.

8. The method as recited in claim 6, wherein the first and second components are caused to rotate and the rotating first plurality of teeth is moved across the roller that is supported for rotation.

9. The method as recited in claim 8, wherein the first plurality of teeth is moved in the direction of the roller during the rotation.

10. The method as recited in claim 6, wherein a relative direction of movement between the roller and the first and second components is changed at least once.

11. The method as recited in claim 6, wherein an axis of rotation of the roller is arranged to be inclined relative to a central axis of rotation of the first and second components in a radial direction by an angle in the direction of the first and second components.

12. A mating connection for a clutch assembly, comprising:
   a first component including:
      an annular disc;
      at least one flange along an outer border of the annular disc;
      a sleeve extending from the annular disc in a first direction;
      a first opening surrounded by the annular disc and the sleeve; and,
      a plurality of teeth extending from the sleeve a first distance in the first direction; and,
      a plurality of segments, each segment in the plurality of segments:
         formed between respective first and second teeth included in the plurality of teeth; and,
         extending from the sleeve a second distance less than the first distance; and,
   a second component including:
      an annular portion;
      a plurality of openings in the annular portion, wherein:
   each tooth included in the plurality of teeth extends through a respective opening included in the plurality of openings;
   said each tooth has a respective end piece extending beyond the second component in the first direction; and,
   the respective end piece overlaps the annular portion between the respective opening and the first opening.

13. The mating connection as recited in claim 12, wherein the plurality of openings is open in a lateral direction.

14. The mating connection as recited in claim 12, wherein the second component is a ring gear.

15. The mating connection as recited in claim 14, wherein the ring gear has an angled cross-section with a first surface portion of the ring gear extending essentially in parallel with an upper side of the first component, the plurality of openings being formed in the first surface portion, and wherein the a second surface portion is angled in the direction of the first component, a tooth structure of the ring gear being formed on the second surface portion.

16. The mating connection as recited in claim 15, wherein the second surface portion is formed on an interior side of the ring gear with the tooth structure protruding in an inward direction or wherein the second surface portion is formed on an exterior side of the ring gear with the tooth structure protruding in an outward direction.

17. A method for creating the mating connection as recited in claim 12, wherein the components are combined by passing the first plurality of teeth of the first component through the plurality of openings of the second component, comprising the step of rolling a roller across the respective end pieces of the first plurality of teeth to exert pressure on the respective end pieces at least partly in a lateral direction to achieve a widening of the respective end pieces.

18. The method as recited in claim 17, wherein the roller is rolled across the respective end pieces of the first plurality of teeth essentially along a longitudinal side of the first plurality of teeth.

19. The method as recited in claim 17, wherein the first and second components are caused to rotate and the rotating first plurality of teeth is moved across the roller that is supported for rotation.

20. The method as recited in claim 19, wherein the first plurality of teeth is moved in the direction of the roller during the rotation.

* * * * *